US012607213B2

(12) United States Patent
Yu et al.

(10) Patent No.: US 12,607,213 B2
(45) Date of Patent: Apr. 21, 2026

(54) EXPANSION CONNECTOR FOR OUTDOOR ENTERTAINMENT EQUIPMENT

(71) Applicant: Crowntec (Jiang Xi) Sports Technology Co. Ltd., Jiujiang City (CN)

(72) Inventors: Cheng-Wu Yu, Jiujiang City (CN); Wei Zhu, Jiujiang City (CN); Li-Ju Hsiang, Jiujiang City (CN)

(73) Assignee: Crowntec (Jiang Xi) Sports Technology Co. Ltd., Jiujiang City (CN)

( * ) Notice: Subject to any disclaimer, the term of this patent is extended or adjusted under 35 U.S.C. 154(b) by 490 days.

(21) Appl. No.: 18/185,201

(22) Filed: Mar. 16, 2023

(65) Prior Publication Data

US 2024/0309898 A1 Sep. 19, 2024

(51) Int. Cl.
| | | |
|---|---|---|
| *F16B 7/04* | (2006.01) | |
| *F16B 7/18* | (2006.01) | |
| *A63G 9/00* | (2006.01) | |

(52) U.S. Cl.
CPC .............. *F16B 7/048* (2013.01); *F16B 7/185* (2013.01); *A63G 9/00* (2013.01); *Y10T 403/4602* (2015.01)

(58) Field of Classification Search
CPC ..... A47G 9/00–22; F16B 7/044; F16B 7/048; F16B 7/0486; F16B 7/185; Y10T 403/34; Y10T 403/341; Y10T 403/342; Y10T 403/347; Y10T 403/46; Y10T 403/4602; Y10T 403/4605; Y10T 403/4608; Y10T 403/4611; Y10T 403/4642;
(Continued)

(56) References Cited

U.S. PATENT DOCUMENTS

| | | | | |
|---|---|---|---|---|
| 2,711,180 A | * | 6/1955 | Sims | .................... E04B 1/34326 |
| | | | | 403/176 |
| 2,711,917 A | * | 6/1955 | Blu | ........................ F16B 7/0486 |
| | | | | 403/171 |

(Continued)

FOREIGN PATENT DOCUMENTS

| | | |
|---|---|---|
| CN | 201664507 U | 12/2010 |
| CN | 203525294 U | 4/2014 |

(Continued)

*Primary Examiner* — Josh Skroupa

(74) *Attorney, Agent, or Firm* — MUNCY, GEISSLER, OLDS & LOWE, P.C.

(57) ABSTRACT

An expansion connector for an outdoor entertainment equipment, includes a base plate and a mounting tube, the base plate includes a flat plate portion, and two wing portions formed by bending from two opposite sides of the flat plate portion toward a same direction, the two opposite sides of the flat plate portion connecting with the two wing portions are not parallel, inclination directions of the two wing portions are opposite, the two wing portions and the flat plate portion jointly define an outdoor entertainment equipment bracket assembly area, the flat plate portion forms at least two first connection through holes, each of the two wing portions forms at least one second connection through hole, the mounting tube is disposed on the flat plate portion and extends in a direction opposite to that of the two wing portions, and the mounting tube forms at least one third connection through hole.

12 Claims, 6 Drawing Sheets

(58) Field of Classification Search
CPC ........ Y10T 403/4645; Y10T 403/4694; A63G 9/00–22
USPC ..... 248/219.4; 403/169, 170, 171, 176, 230, 403/231, 232.1, 233, 234, 245, 246, 263; 472/118–125
See application file for complete search history.

(56) References Cited

U.S. PATENT DOCUMENTS

| | | | | |
|---|---|---|---|---|
| 2,818,289 | A * | 12/1957 | Horowitz ................. | A63G 9/12 403/171 |
| 2,854,263 | A * | 9/1958 | Steller ................... | F16B 7/0486 403/176 |
| RE25,623 | E * | 7/1964 | Bristle ................. | A01K 13/004 403/176 |
| 3,195,845 | A * | 7/1965 | Conti ...................... | F16B 7/048 403/313 |
| 4,190,283 | A | 2/1980 | Boucher | |
| 4,256,300 | A * | 3/1981 | Boucher ................. | A63G 9/00 403/65 |
| 4,526,348 | A * | 7/1985 | Cammack ............ | F16B 7/0486 403/233 |
| 4,648,734 | A * | 3/1987 | Daus, Jr. .............. | F16B 7/0486 403/170 |
| 5,259,685 | A * | 11/1993 | Gilb .......................... | E04B 1/26 403/231 |
| 5,274,981 | A * | 1/1994 | Commins ............... | F16B 9/058 403/232.1 |
| 5,331,992 | A * | 7/1994 | Gremont ................. | E04H 15/58 403/171 |
| 6,669,394 | B1 * | 12/2003 | Rieber ..................... | A63G 9/12 403/164 |
| 8,079,915 | B2 * | 12/2011 | Spencer .................. | A63G 9/00 472/118 |
| 8,235,338 | B1 * | 8/2012 | Henry ...................... | A63G 9/00 403/170 |
| 9,255,396 | B2 * | 2/2016 | Eberhart .............. | F16B 7/0486 |
| 11,236,774 | B1 * | 2/2022 | Bollman ................ | F16B 7/185 |
| 11,317,600 | B2 * | 5/2022 | Huthmaker .......... | F16B 7/0486 |

FOREIGN PATENT DOCUMENTS

| | | | | |
|---|---|---|---|---|
| CN | 203525295 | U | 4/2014 | |
| CN | 204745626 | U | 11/2015 | |
| CN | 217367120 | U | 9/2022 | |
| EP | 0985437 | A2 * | 3/2000 | ............. F16B 7/185 |
| FR | 1264771 | A * | 6/1961 | ........... F16B 7/0486 |
| GB | 432133 | A * | 7/1935 | .............. A63G 9/12 |
| GB | 2503757 | A * | 1/2014 | ........... F16B 7/0486 |

* cited by examiner

EXPANSION CONNECTOR FOR OUTDOOR ENTERTAINMENT EQUIPMENT

FIELD OF THE INVENTION

The invention relates to an expansion connector, and more particularly to an expansion connector for an outdoor entertainment equipment.

BACKGROUND OF THE INVENTION

Chinese Patent Nos. CN 203525294U, CN 201664507U, CN 203525295U, CN 204745626U, CN 217367120U and U.S. Pat. No. 4,190,283A respectively disclose that an outdoor entertainment equipment can be assembled from a variety of amusement facilities. However, in the previous patents, it is disclosed that the various amusement facilities are still assembled together through additional structures. Taking Chinese Patent No. CN 203525294U as an example, an additional horizontal tube is added on each of two sides of the swing device, through which the slide and the seesaw are respectively assembled, so that the swing device can be assembled with the slide and the seesaw to form a combined outdoor entertainment equipment.

As a result, the conventional outdoor entertainment equipment still needs to be sold or implemented in a set of structures, and the amusement facilities cannot be expanded and positions thereof cannot be changed as desired. Therefore, the conventional outdoor entertainment equipment still cannot be combined and expanded as desired. Furthermore, the conventional outdoor entertainment equipment needs to change the existing equipment structure in order to assemble with equipment for other entertainment purposes, which is not conducive to implementation.

SUMMARY OF THE INVENTION

A main object of the invention is to solve the problem that the conventional assembled outdoor entertainment equipment cannot be combined and expanded as desired.

In order to achieve the above object, the invention provides an expansion connector for an outdoor entertainment equipment, which includes a base plate and a mounting tube, the base plate includes a flat plate portion, and two wing portions formed by bending from two opposite sides of the flat plate portion toward a same direction, the two opposite sides of the flat plate portion that connect with the two wing portions are not parallel to each other, inclination directions of the two wing portions are opposite, the two wing portions and the flat plate portion jointly define an outdoor entertainment equipment bracket assembly area, the flat plate portion forms at least two first connection through holes, the at least two first connection through holes are respectively adjacent to the two opposite sides of the flat plate portion that connect with the two wing portions, each of the two wing portions forms at least one second connection through hole, the mounting tube is disposed on the flat plate portion and extends in a direction opposite to that of the two wing portions, and the mounting tube forms at least one third connection through hole. The base plate is provided for assembling on a bracket of the outdoor entertainment equipment, and the mounting tube is provided for an assembly tube of an expanded entertainment equipment to be assembled therein.

In one embodiment, each of the at least one second connection through hole is an elongated hole.

In one embodiment, the at least two first connection through holes are respectively located on two extension lines parallel to the two wing portions.

In one embodiment, a position where the mounting tube connects to the flat plate portion is between the two extension lines.

In one embodiment, each of the at least two first connection through holes is an elongated hole.

In one embodiment, another two opposite sides of the flat plate portion not connected to the two wing portions respectively include a straight section and two inclined sections respectively connected to two ends of the straight section.

In one embodiment, the another two opposite sides of the flat plate portion not connected to the two wing portions have unequal lengths.

In one embodiment, a center of the mounting tube is deviated from a center of the flat plate portion.

Through the aforementioned implementation of the invention, the invention has the following features compared with the conventional technique: to expand the outdoor entertainment equipment, the invention provides the expansion connector. The base plate of the expansion connector is provided for assembling on the outdoor entertainment equipment, and the expansion connector provides the mounting tube for the expanded entertainment equipment to be assembled therein. The expanded entertainment equipment is allowed to be chosen by the user and to be assembled, which eliminates the need for bundling and selling combinations of both the outdoor entertainment equipment and the expanded entertainment equipment. Therefore, the invention realizes an object of expanding the outdoor entertainment equipment as desired.

DETAILED DESCRIPTION OF THE PREFERRED EMBODIMENTS

The detailed description and technical content of the invention are described below with reference to the accompanying drawings.

Figure 1:
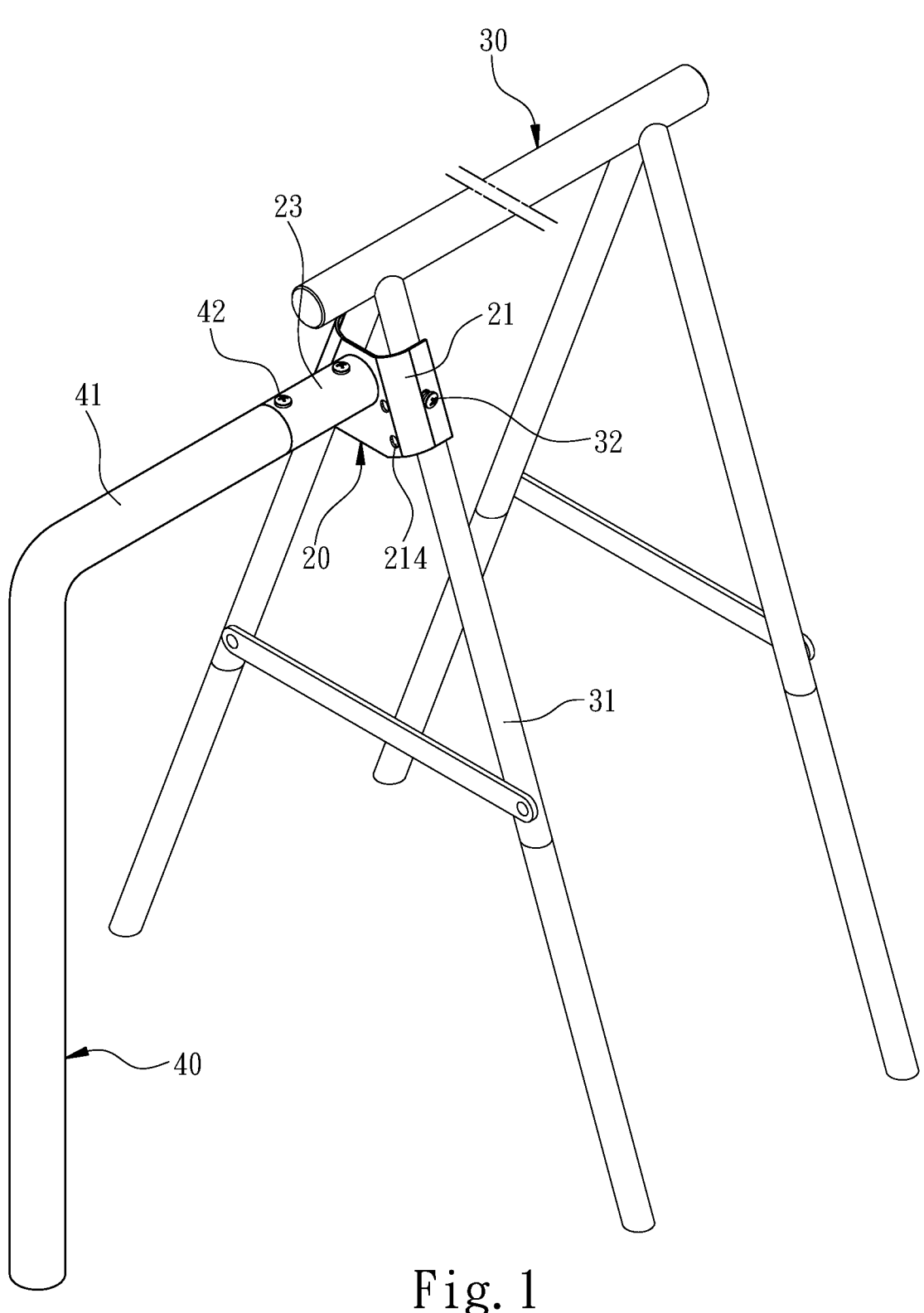
FIG. 1 is a perspective view of an outdoor entertainment equipment and an expanded entertainment equipment according to an embodiment of the invention.
Figure 2:
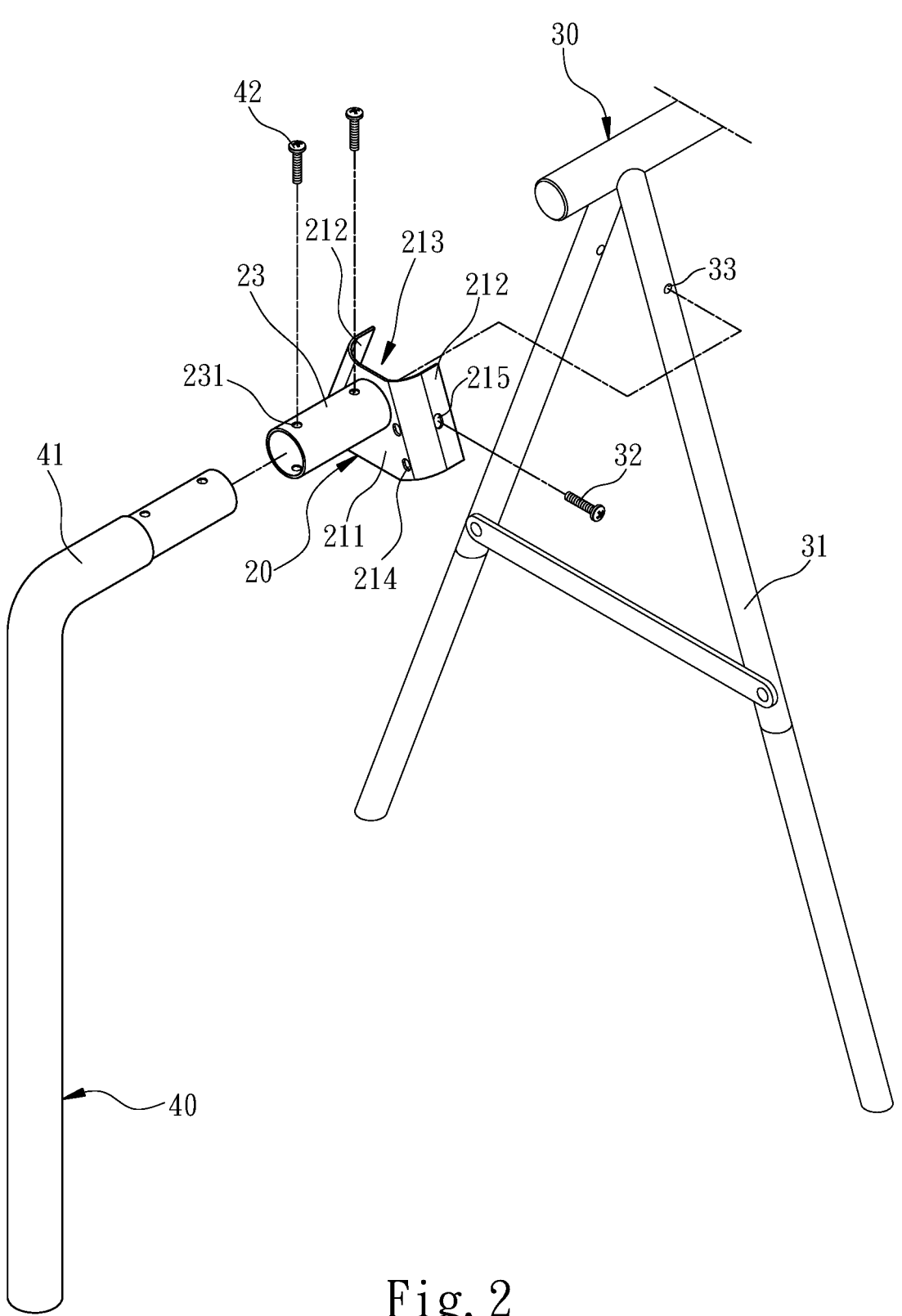
FIG. 2 is a perspective view of an assembling embodiment of the outdoor entertainment equipment with the expanded entertainment equipment according to the embodiment of the invention.

Please refer to FIG. 1 and FIG. 2, the invention provides an expansion connector 20, the expansion connector 20 links between an outdoor entertainment equipment 30 and an expanded entertainment equipment 40, that is, the expansion connector 20 provides the outdoor entertainment equipment 30 with a function of expanding other amusement facilities. It should be understood that the expansion connector 20 is an independent structure relative to the outdoor entertainment equipment 30, and the expansion connector 20 does not need to change structures of the outdoor entertainment equipment 30, but is disposed on the outdoor entertainment equipment 30 through optional combination to achieve an object of optional expansion.

Figure 4:
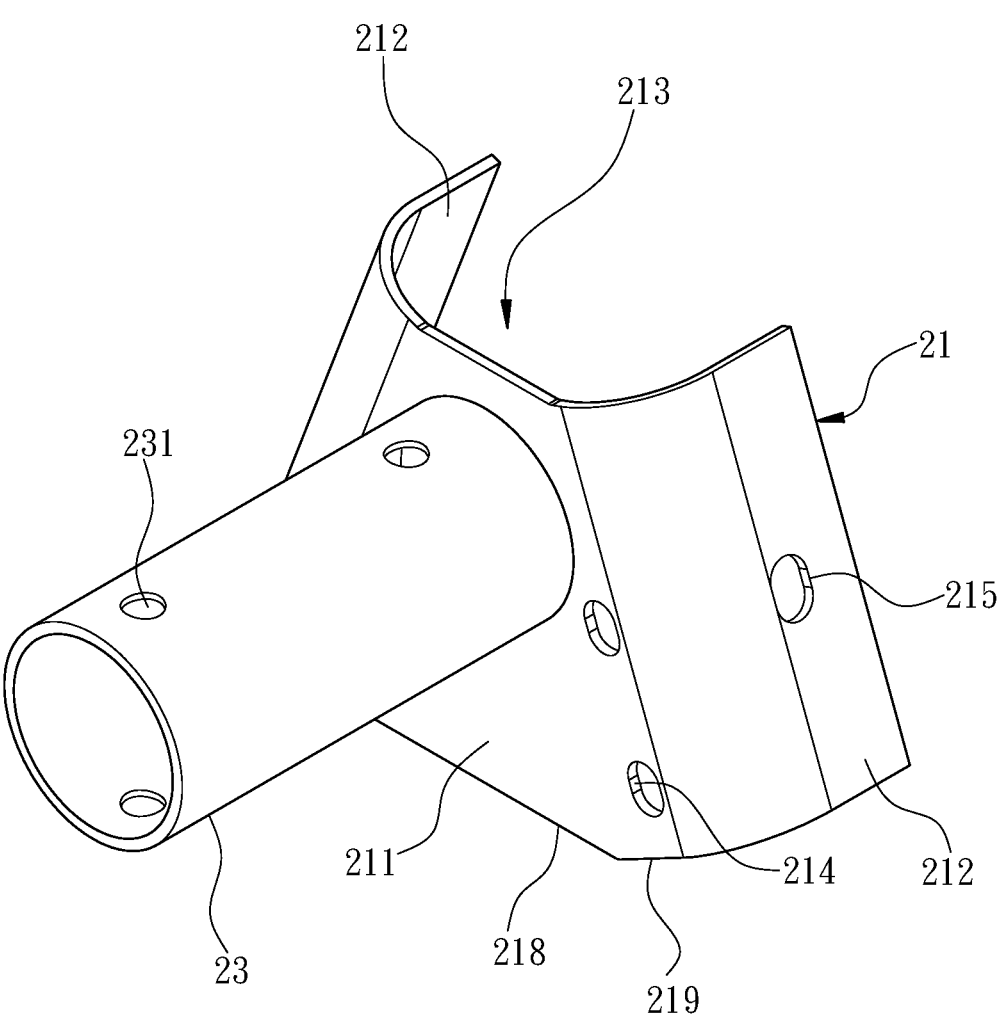
FIG. 4 is a perspective view of the expansion connector according to the embodiment of the invention.
Figure 5:
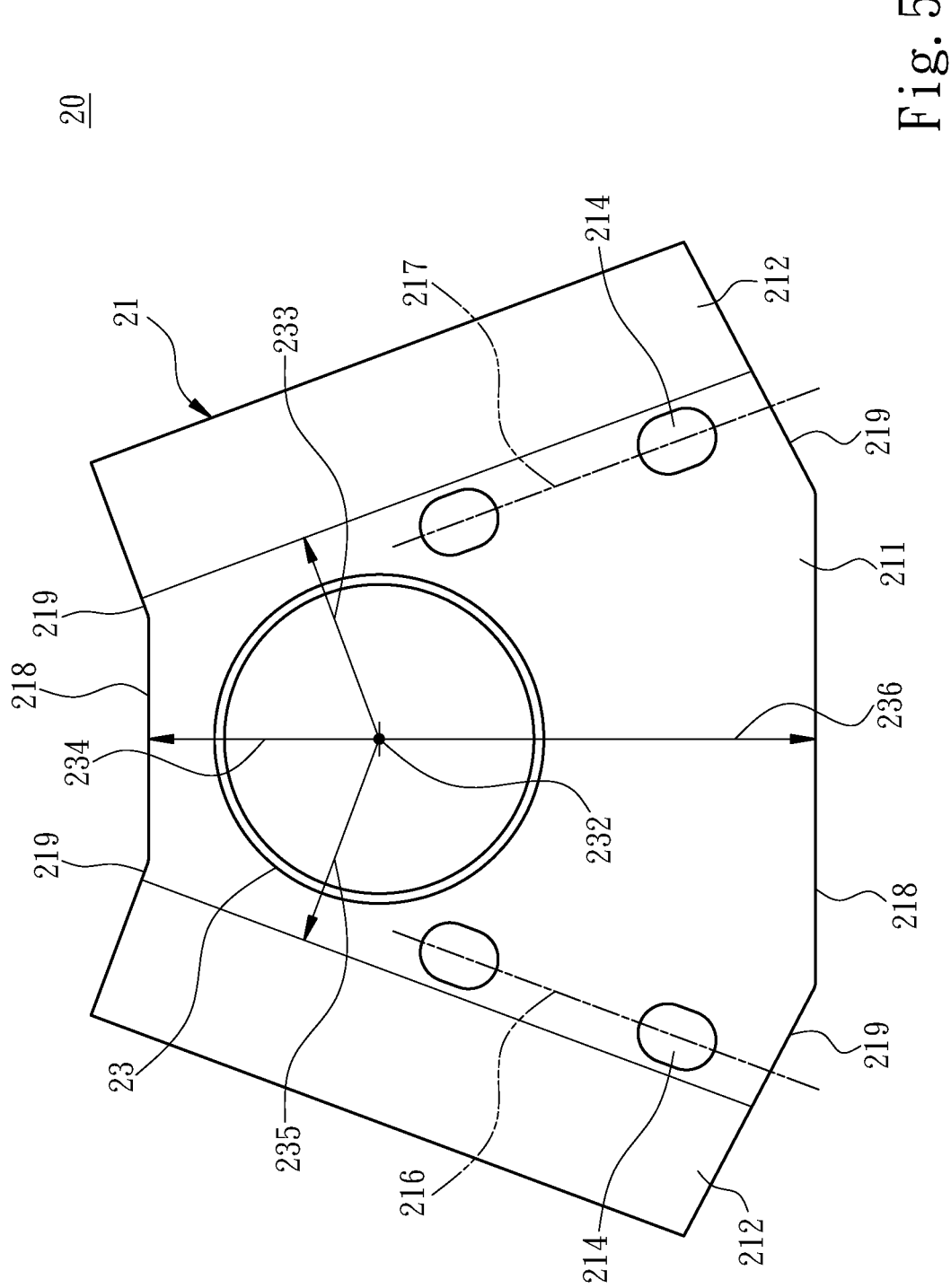
FIG. 5 is a first plan structural view of the expansion connector according to the embodiment of the invention.
Figure 6:
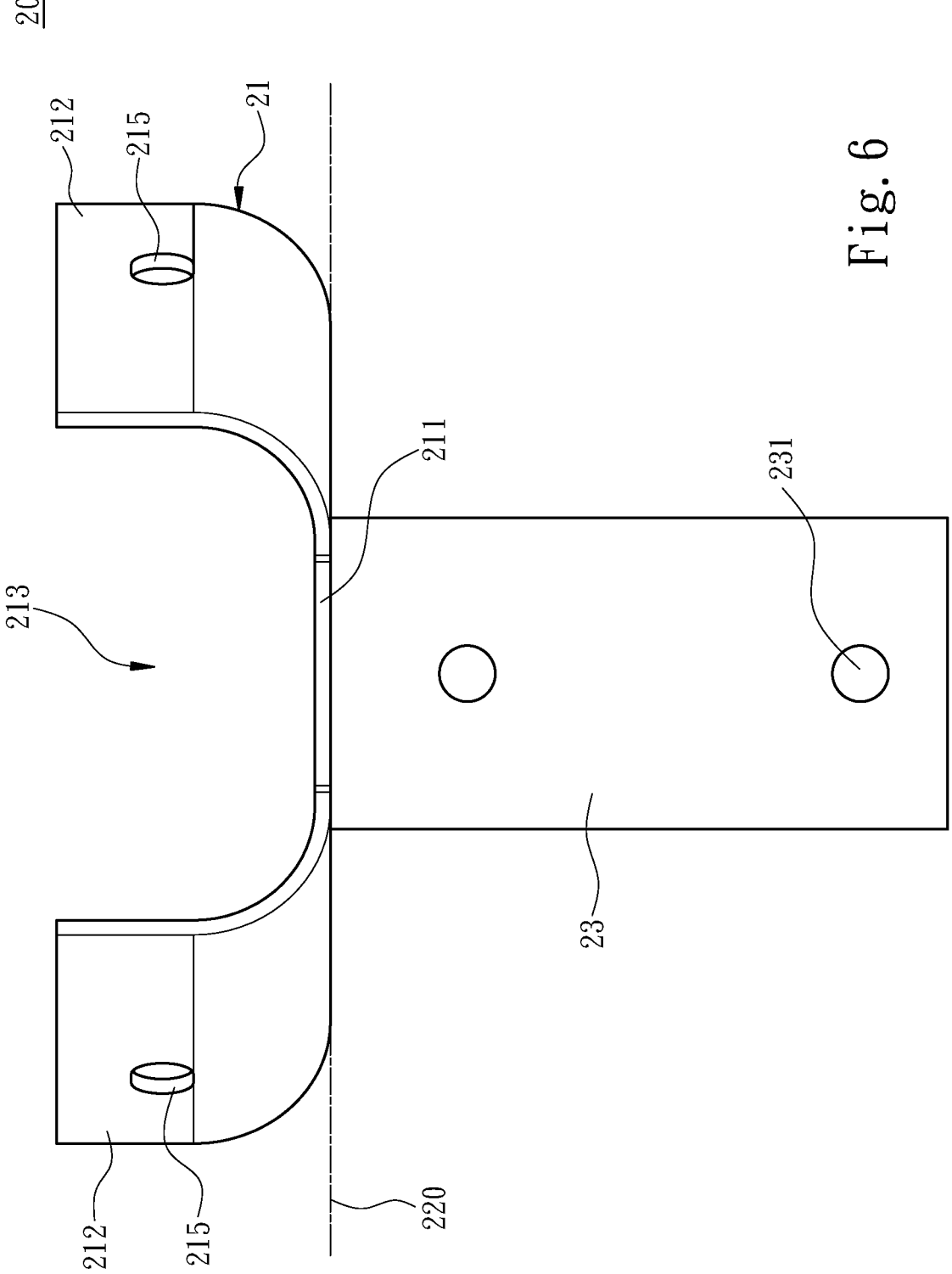
FIG. 6 is a second plan structural view of the expansion connector according to the embodiment of the invention.

Please refer to FIG. 4, FIG. 5, and FIG. 6, the expansion connector 20 comprises a base plate 21 and a mounting tube 23, the base plate 21 comprises a flat plate portion 211 and two wing portions 212, the flat plate portion 211 and the two wing portions 212 are integrally formed. In some embodiments, the flat plate portion 211 and the two wing portions 212 are one-piece formed. The two wing portions 212 extend from two opposite sides of the flat plate portion 211 and are formed by bending toward a same direction opposite to the flat plate portion 211 so that extending directions of the two wing portions 212 are the same. Moreover, the base plate 21 of the invention provides a function of assembling with external structures, and the two opposite sides of the flat plate portion 211 connected to the two wing portions 212 are not parallel to each other. In one embodiment, the two opposite sides of the flat plate portion 211 connected to the two wing portions 212 are designed to be relatively inclined, so that the flat plate portion 211 is substantially trapezoidal. In other words, two opposite sides of the flat plate portion 211 that are not connected to the two wing portions 212 are unequal in length, and inclination directions of the two wing portions 212 are opposite.

Further, the two wing portions 212 and the flat plate portion 211 jointly define an outdoor entertainment equipment bracket assembly area 213, the outdoor entertainment equipment bracket assembly area 213 is provided for assembling with the outdoor entertainment equipment 30, a width of the outdoor entertainment equipment bracket assembly area 213 is determined by the two wing portions 212, and the outdoor entertainment equipment bracket assembly area 213 presents a narrow top and a wide bottom. The base plate 21 is provided for assembly, the flat plate portion 211 forms at least two first connection through holes 214, the at least two first connection through holes 214 communicate with the outdoor entertainment equipment bracket assembly area 213, and are respectively adjacent to the two opposite sides of the flat plate portion 211 that connect with the two wing portions 212. Each of the two wing portions 212 forms at least one second connection through hole 215, the at least one second connection through hole 215 communicates with the outdoor entertainment equipment bracket assembly area 213, and has an axial direction different from that of the at least two first connection through holes 214.

In addition, the mounting tube 23 is disposed on the flat plate portion 211, and an extension direction of the mounting tube 23 is opposite to that of the two wing portions 212. Taking a plate surface of the flat plate portion 211 as a boundary (as indicated by reference numeral 220), the mounting tube 23 and the two wing portions 212 are respectively located on two surfaces of the flat plate portion 211. Moreover, the mounting tube 23 is provided for assembly, the mounting tube 23 is formed with at least one third connection through hole 231, the at least one third connection through hole 231 penetrates through a tube wall of the mounting tube 23 and communicates with an inner space of the mounting tube 23.

Figure 3:
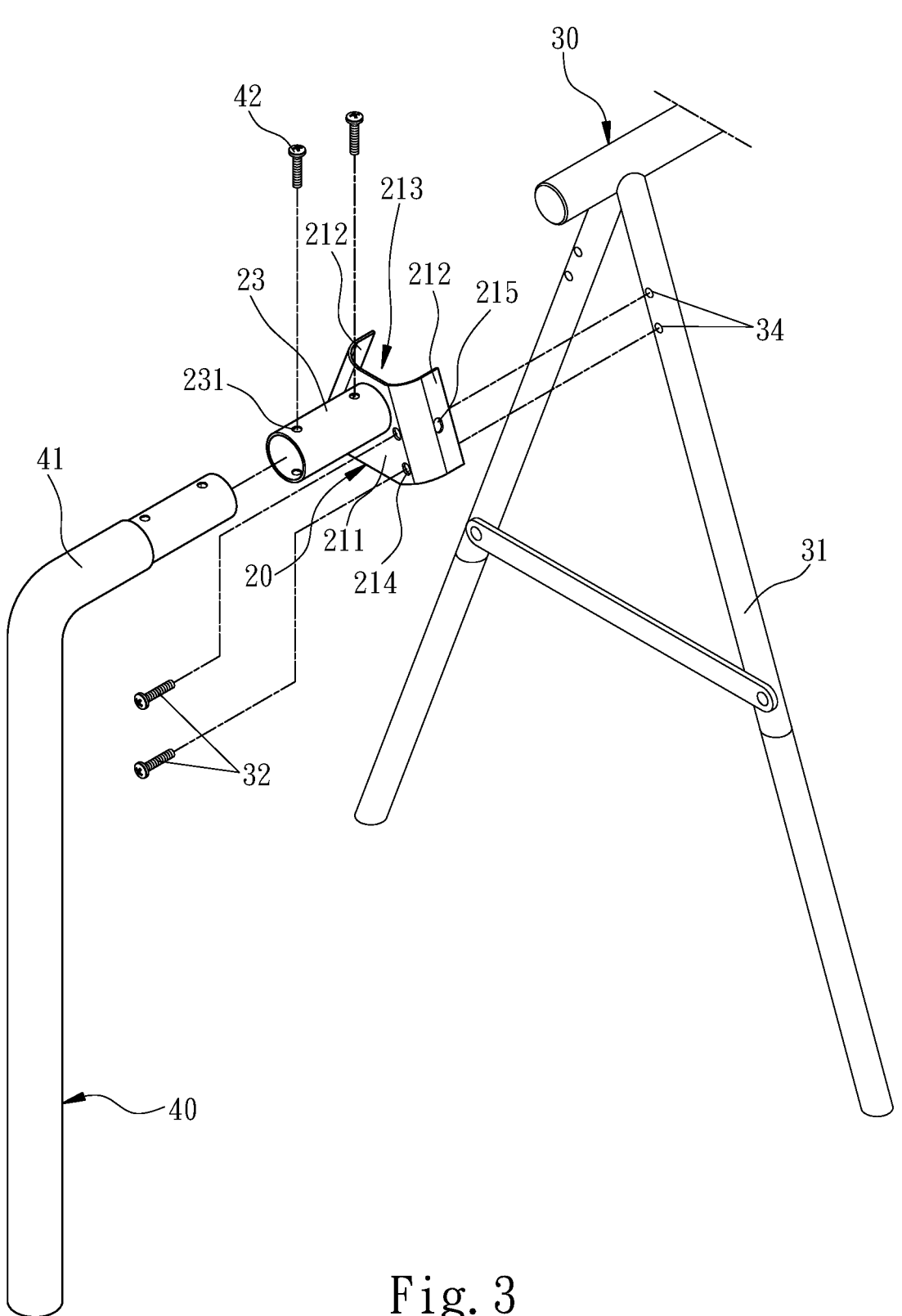
FIG. 3 is a perspective view of an another assembling embodiment of the outdoor entertainment equipment with the expanded entertainment equipment according to the embodiment of the invention.

Please refer to FIG. 1, FIG. 2, FIG. 3, and FIG. 4, implementation of the expansion connector 20 will be described as follows. When the expansion connector 20 needs to connect with the outdoor entertainment equipment 30 and the expanded entertainment equipment 40, the base plate 21 is assembled with a bracket 31 of the outdoor entertainment equipment 30, and the mounting tube 23 is provided for an assembly tube 41 of the expanded entertainment equipment 40 to be assembled therein. To illustrate in more detail, assuming that the outdoor entertainment equipment 30 is a swing device, and the expanded entertainment equipment 40 is a carousel, the expansion connector 20 is assembled on a swing frame (that is, the bracket 31) of the swing device with the base plate 21, the swing frame is A-shaped, and the two wing portions 212 of the expansion connector 20 match with a shape of the swing frame, so that the swing frame is disposed in the outdoor entertainment equipment bracket assembly area 213. Moreover, when the expansion connector 20 is assembled with the outdoor entertainment equipment 30, one of the at least two first connection through holes 214 or the at least one second connection through hole 215 is connected to the bracket 31. For example, the bracket 31 forms at least one first assembly hole 33, the expansion connector 20 connects with the at least one first assembly hole 33 through the at least one second connection through hole 215, and is fixed through at least one connector 32, as shown in FIG. 2. In some embodiments, the bracket 31 forms at least one second assembly hole 34, the expansion connector 20 connects with the at least one second assembly hole 34 through one of the at least two first connection through holes 214, and is fixed through the at least one connector 32, as shown in FIG. 3. When the expansion connector 20 needs to be connected to the expanded entertainment equipment 40, the expansion connector 20 uses the mounting tube 23 to provide the assembly tube 41 of the expanded entertainment equipment 40 to insert therein, and the at least one third connection through hole 231 is provided for assembling with at least one connector 42, so that the at least one connector 42 is assembled to the assembly tube 41, and the expanded entertainment equipment 40 and the mounting tube 23 form an assembly relationship. It should be understood that in one embodiment, the expanded entertainment equipment 40 is a see-saw. In the figures, the expanded entertainment equipment 40 is simply shown, and only the assembly tube 41 is depicted. The expanded entertainment equipment 40 actually comprises other structures, and is not limited to what is drawn in the figures.

It can be known from the above that the expansion connector 20 of the invention is used on the outdoor entertainment equipment 30 of different brands or models, and the expansion connector 20 is connected with the bracket 31 through the at least two first connection through holes 214 or the at least one second connection through hole 215, and the invention does not limit a type of the connected outdoor entertainment equipment 30. At the same time, when the invention needs to add other amusement facilities, through disposition of the expansion connector 20, the outdoor entertainment equipment 30 is assembled with the expanded entertainment equipment 40 without changing its own structures, thereby providing the outdoor entertainment equipment 30 with a function of expanding as desired. Furthermore, the expansion connector 20 of the invention determines a disposing position of the expanded entertainment equipment 40 according to a position where a user assembles the expansion connector 20 on the outdoor entertainment equipment 30, and the expanded entertainment equipment 40 is assembled according to an amusement facility chosen by the user, and expanded amusement facilities of the outdoor entertainment equipment 30 is replaceable. Compared with the conventional technique, the expansion connector 20 of the invention is capable of specifically realizing an object of expansion and assembly of the outdoor entertainment equipment 30 as desired.

Please refer to FIG. 1, FIG. 2, FIG. 3, FIG. 4, and FIG. 5, in order for the expansion connector 20 of the invention to match and assemble with the outdoor entertainment equipment 30 of different types, each of the at least two first connection through holes 214 is an elongated hole, an object is that because a position of the at least one second assembly hole 34 on the bracket 31 of the outdoor entertainment equipment 30 of different types may be slightly different, by having each of the at least two first connection through holes 214 designed as an elongated hole, the invention is capable of coping with the problem of position deviation of the at least one second assembly hole 34. In another embodiment, each of the at least one second connection through hole 215 is designed as an elongated hole corresponding to the at least one first assembly hole 33.

Please refer to FIG. 4, FIG. 5, and FIG. 6, the at least two first connection through holes 214 are respectively located on two extension lines 216, 217, the two extension lines 216, 217 are located on the flat plate portion 211 and parallel to the two wing portions 212, and the two extension lines 216, 217 are not parallel to each other. In another embodiment, a position where the mounting tube 23 connects to the flat plate portion 211 is located between the two extension lines 216, 217, that is, the mounting tube 23 is not connected to the at least two first connection through holes 214. More specifically, a center (as indicated by reference numeral 232) of the mounting tube 23 is away from a center of the flat plate portion 211, so that distances (as indicated by reference numerals 233, 234, 235, 236) between the center of the mounting tube 23 and four sides of the flat plate portion 211 are not equal. In addition, in another embodiment, an end of the mounting tube 23 connected to the flat plate portion 211 does not penetrate through the flat plate portion 211, so that the mounting tube 23 does not communicate with the outdoor entertainment equipment bracket assembly area 213, thus when the mounting tube 23 is assembled with the assembly tube 41 of the expanded entertainment equipment 40, the flat plate portion 211 limits an assembly position of the assembly tube 41, and preventing the assembly tube 41 from inserting into the outdoor entertainment equipment bracket assembly area 213 to interfere with the outdoor entertainment equipment 30.

Please refer to FIG. 4, FIG. 5, and FIG. 6, in one embodiment, the two opposite sides of the flat plate portion 211 that are not adjacent to the two wing portions 212 have a straight section 218 and two inclined sections 219 respectively, the straight section 218 serves as a part of an edge of the flat plate portion 211, and the two inclined sections 219 are respectively connected to two ends of the straight section 218. In one embodiment, a length of the straight section 218 is greater than a length of each of the two inclined sections 219.

What is claimed is:

1. An expansion connector for an outdoor entertainment equipment, comprising:

a base plate comprising a flat plate portion, and two wing portions formed by bending from two opposite sides of the flat plate portion toward a same direction, the two opposite sides of the flat plate portion connecting with the two wing portions being not parallel to each other, inclination directions of the two wing portions being opposite, the two wing portions and the flat plate portion jointly defining an outdoor entertainment equipment bracket assembly area, the flat plate portion forming at least two first connection through holes, the at least two first connection through holes being respectively adjacent to the two opposite sides of the flat plate portion connecting with the two wing portions, each of the two wing portions forming at least one second connection through hole; and a mounting tube disposed on the flat plate portion and extending in a direction opposite to that of the two wing portions, the mounting tube forming at least one third connection through hole;

wherein the base plate is provided for assembling on a bracket of the outdoor entertainment equipment, and the mounting tube is provided for an assembly tube of an expanded entertainment equipment to be assembled therein.

2. The expansion connector for the outdoor entertainment equipment as claimed in claim 1, wherein each of the at least one second connection through hole is an elongated hole.

3. The expansion connector for the outdoor entertainment equipment as claimed in claim 1, wherein the at least two first connection through holes are respectively located on two extension lines parallel to the two wing portions.

4. The expansion connector for the outdoor entertainment equipment as claimed in claim 3, wherein a position where the mounting tube connects to the flat plate portion is between the two extension lines.

5. The expansion connector for the outdoor entertainment equipment as claimed in claim 3, wherein each of the at least two first connection through holes is an elongated hole.

6. The expansion connector for the outdoor entertainment equipment as claimed in claim 5, wherein each of the at least one second connection through hole is an elongated hole.

7. The expansion connector for the outdoor entertainment equipment as claimed in claim 6, wherein another two opposite sides of the flat plate portion not connected to the two wing portions respectively comprise a straight section and two inclined sections respectively connected to two ends of the straight section.

8. The expansion connector for the outdoor entertainment equipment as claimed in claim 7, wherein the another two opposite sides of the flat plate portion not connected to the two wing portions have unequal lengths.

9. The expansion connector for the outdoor entertainment equipment as claimed in claim 8, wherein a center of the mounting tube is deviated from a center of the flat plate portion.

10. The expansion connector for the outdoor entertainment equipment as claimed in claim 1, wherein another two opposite sides of the flat plate portion not connected to the two wing portions respectively comprise a straight section and two inclined sections respectively connected to two ends of the straight section.

11. The expansion connector for the outdoor entertainment equipment as claimed in claim 10, wherein the another two opposite sides of the flat plate portion not connected to the two wing portions have unequal lengths.

12. The expansion connector for the outdoor entertainment equipment as claimed in claim 1, wherein a center of the mounting tube is deviated from a center of the flat plate portion.

\* \* \* \* \*